May 6, 1952     S. DE WRANGELL     2,595,775
HYDRAULIC VALVE-OPERATING SYSTEM

Filed July 26, 1947     3 Sheets-Sheet 1

INVENTOR:
SERGE DE WRANGELL
by
Richardson, David and Nordon
Att'ys

May 6, 1952 S. DE WRANGELL 2,595,775
HYDRAULIC VALVE-OPERATING SYSTEM
Filed July 26, 1947 3 Sheets-Sheet 2
Fig. 2
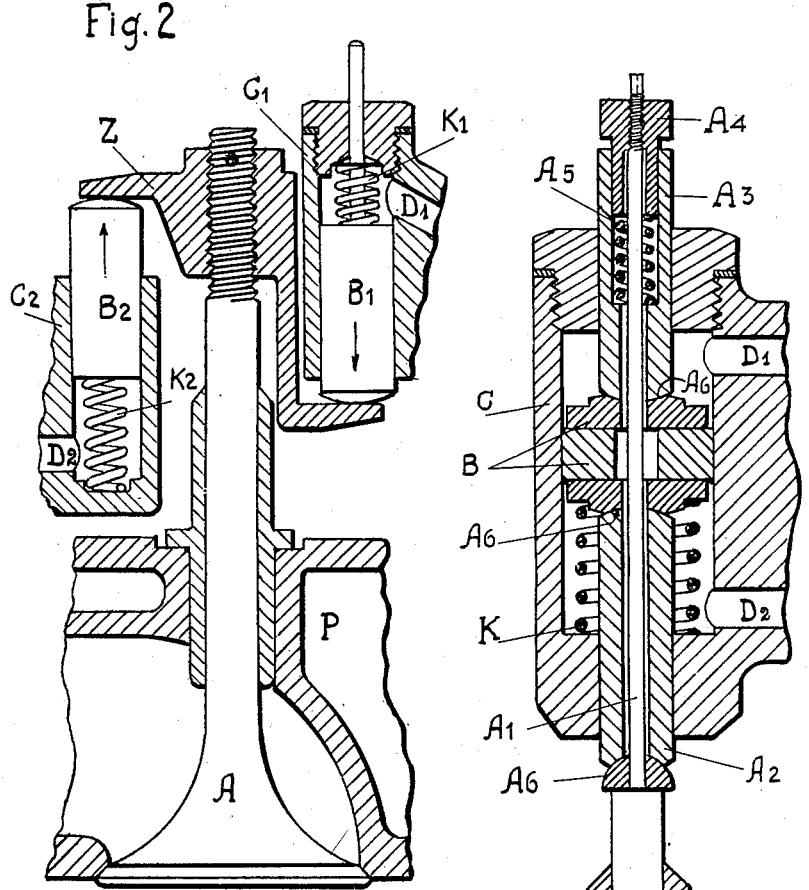
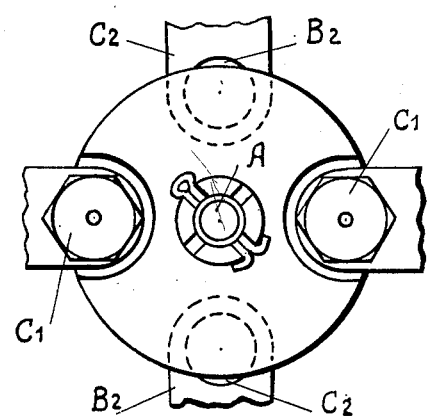
Fig. 3
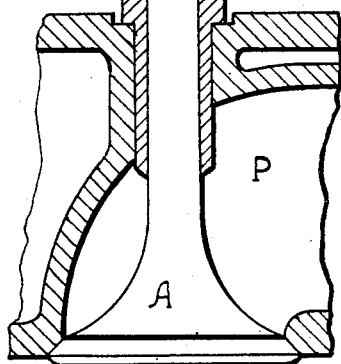
Fig. 4
INVENTOR:
SERGE DE WRANGELL
By Richardson, David and Nordon
Att'ys

INVENTOR:
SERGE DE WRANGELL

Patented May 6, 1952

2,595,775

UNITED STATES PATENT OFFICE 2,595,775

HYDRAULIC VALVE OPERATING SYSTEM

Serge de Wrangell, Paris, France

Application July 26, 1947, Serial No. 763,820
In France July 31, 1946

3 Claims. (Cl. 123—90)

The invention relates to hydraulic transmission between a driving member and a driven member and refers more particularly to a valve operating mechanism embodying a hydraulic transmission between the operating cam or cams and the valve or valves of a machine such as an internal combustion engine or an explosion engine.

The main object of the invention is to provide a machine having a driving member and a driven member with a hydraulic transmission interconnecting said members, with a replenishing system under low pressure (which may be the lubricating system of the machine) associated with said transmission and with a common source feeding the same liquid to said transmission and to said replenishing system.

Another object of my invention is to realize in a machine such as an explosion engine, a variable distribution by means of puppet-valves requiring no expansion space, no adjustment and no heavy and bulky linkage in the case of head operated valves, while the filling of the cylinder or cylinders is obtained to the optimum degree for each rate of running by means of rapidly acting cams operating said puppet-valves through the intermediary of hydraulic transmission or transmissions.

Another object of my invention is to organize the operation of such rapidly acting cams in such way that the engine will remain silent by reason of play and of the use as a driving medium of a fluid submitted to successive pulsations in opposite directions.

An important feature of the present invention is to suppress all undesirable volumetric changes in a hydraulic transmission of the above-defined type by means of a replenishing, expansion and air-purging chamber, which cooperate with each hydraulic transmission between a driving member and a driven member so as to maintain practically constant the volume of liquid within said transmission during the active pulsations thereof.

Another feature of the invention is to provide means insuring that each cycle of the operation of the machine starts from a given position and tends to return in said position all the active movable members of such hydraulic transmissions after each operation thereof, and safety means to prevent the jamming of the system during these readjustments.

A further feature of the invention is the provision of an auxiliary spring which acts on the driven member and/or on the driving member of each transmission without interfering with this latter, to prevent undesirable play and to return and maintain these members in a determined position of rest after each operation.

Other objects, features and advantages of the present invention will become apparent from the reading of the following description of an embodiment of the invention, given as an example in reference to the accompanying drawings, in which:

Fig. 2 is a detail sectional view of a modified arrangement of the actuating members of the puppet-valve;

Fig. 3 is a plan view of the modification of Fig. 2;

Fig. 4 is a detail sectional view of a modified stem arrangement for the puppet-valve constituting the driven member of the hydraulic system of the invention;

Figure 1:
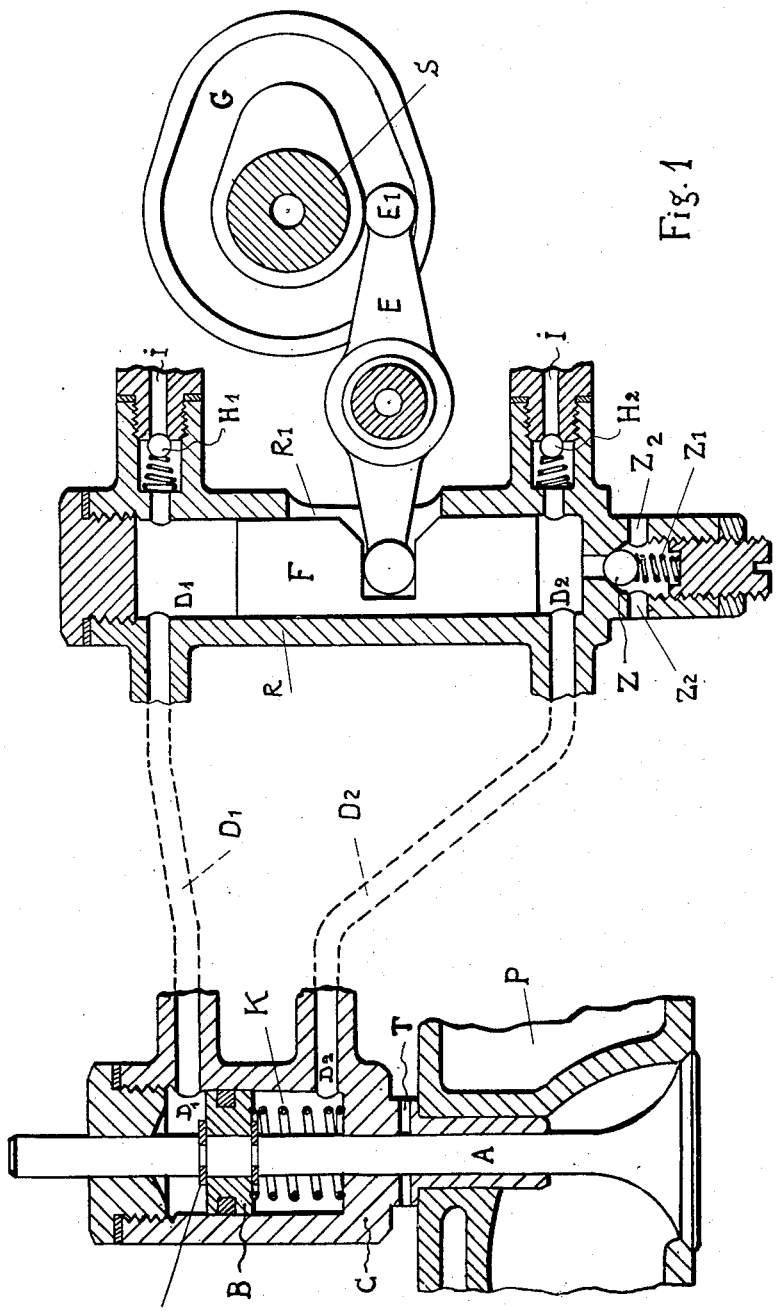
Fig. 1 is a sectional diagram of the principle of the invention shown, as an example and for sake of clarity only, as applied to the control of a puppet-valve of explosion engines as used for motor-cars.

In Fig. 1 of these drawings there is represented a portion of an internal combustion engine to which my improved hydraulic transmission has been applied.

The puppet-valve A to be operated is provided with the usual operating stem passing outward through the cylinder head P and is kept applied on its seat during its rest periods by a spring K calibrated so as to overcome the weight of the valve and its stem.

To avoid complexity of construction and minimize both noise and back-lash incident to any mechanical construction having a plurality of joints therein, it has already been proposed to dispense with the usual rod and lever connection intermediate the cam-shaft and the puppet-valves, and to substitute therefor a hydraulic transmission of variable volume provided, either with expansible and contractable bellows, or with spring-pressed plungers slidably mounted at each extremity of the hydraulic transmission.

While these variable-volume hydraulic transmissions require accurate adjustments and rather intricate expansion, replenishing and air-purging means, the hydraulic transmission of the invention readjusts itself automatically and requires a minimum of accessories to insure its regular, smooth and noiseless operation.

In the schematic and simplified form shown in Fig. 1 of the drawings, this hydraulic transmission comprises: a driving station or cam-assembly consisting of a grooved cam G fastened on the cam-shaft S, of an oscillating lever E actuating through a slot $R_1$ provided in the wall of a cylinder R, a double-acting piston F working in said cylinder R, and a driven station or valve-assembly formed by the puppet-valve A, the stem of which carries a double-acting piston B working in a cylinder C. These two stations or assemblies are interconnected by conduits $D'_1$, $D'_2$ which form, in association with the corresponding chambers $D_1$, $D_2$ on the opposite sides of the pistons F and B, a hydraulic transmission, which controls the operation of the valve A.

The piston B is maintained in position on the stem of valve A by means of two retaining washers W. The cylinder C guides the stem or rod of the puppet-valve A and is provided adjacent the cylinder-head P with ports or vents T preventing excessive penetration of oil around this valve-stem or rod.

In this hydraulic transmission, only three auxiliary valves are required in order to maintain a constant total volume of oil in the hydraulic closed system $D_1$ and $D_2$, respectively during the operation of the driving cam G: a first loaded replenishing valve $H_1$ which establishes a momentary communication between the hydraulic closed system $D_1$ and a conduit I leading to a replenishing tank or source of liquid under low pressure (not shown); a second loaded replenishing valve $H_2$ establishing a momentary communication between the hydraulic closed system $D_2$ and a second conduit I leading to the same replenishing tank or source of liquid under low pressure; and a safety expansion valve Z kept normally closed by a relatively strong spring $Z_1$.

The operation of this hydraulic transmission is as follows:

When the engine is started, according to the angular position of the actuating cam G with respect to the cam-follower $E_1$ carried at the end of the lever E, the piston F is either raised or lowered and either the oil in the system $D_1$, or the oil in the system $D_2$ is placed under pressure.

In the first case, the piston B is pushed downward thereby opening the valve A and expelling a sufficient volume of oil through the return conduit $D_2$ to form in the lower chamber of the cylinder R a raising column of oil following the ascending movement of the piston F. All three valves $H_1$, $H_2$, Z remain closed.

But in the second case, the piston B is locked and prevented from moving upward by the valve A, which is then resting on its seat and the whole mechanism would be jammed or a break would occur in the system $D_2$, were it not for the presence of the safety expansion valve Z, which then opens automatically to let the surplus oil escape. Simultaneously, in order to prevent the formation of a vacuum in the system $D_1$, the valve $H_1$ opens to admit a corresponding volume of oil coming from the replenishing tank into said system $D_1$. As soon as this automatic readjustment of the relative position of the cam G with respect to the valve A (or of the piston F with respect to the piston B) has taken place, both valves Z and $H_1$ are again closed by their respective spring and the operation of the mechanism becomes and stays normal as long as the engine continues to run.

In certain cases it may be advantageous to control the valve A as shown on the Figures 2 and 3, that is by means of four pistons, two pistons $B_1$ for its opening and two pistons $B_2$ for its closure. In order to equilibrate the stresses, these pistons $B_1$, $B_2$ are then symmetrically arranged two by two with respect to the axis of the valve stem.

Therefore the resultant of the forces applied by these pistons on the valve A in either direction passes through this axis of the valve stem.

In this modification, there are obviously a pair of open-bottom cylinders $C_1$ for the pistons $B_1$ and a second pair of open-top cylinders $C_2$ for the pistons $B_2$; and (instead of having a spring K only in the system $D_2$) there is a spring $K_1$ or $K_2$ for keeping each piston constantly applied on a nut Z screwed on a threaded portion of the valve-stem, the springs $K_2$ being stronger than the springs $K_1$ in order to play the part of the spring K in Figure 1.

Fig. 4 shows a modification of the stem of the puppet-valve A, in which this stem is rendered more or less flexible and self-aligning by being made of a plurality of coextensive tubular parts.

In this modification, the valve-stem proper terminates into a flexible elongated central pin $A_1$ on which are threaded successively a sleeve supporting member $A_6$, a lower sleeve $A_2$, the piston B, an upper sleeve $A_3$ and a nut $A_4$ maintaining the other parts of this assembly elastically pressed together through the intermediary of a spring $A_5$. The adjacent surfaces of all these parts are spherical to increase the flexibility of the assembly.

As the safety valve Z should remain closed during the operation of the engine under all conditions, one has to calibrate its spring $Z_1$ so that it will open only for relatively very high over-pressures. This leads in certain cases to a disagreeable effect of braking of the engine at when starting it, when the excess of oil in the system $D_2$ is allowed to escape through the safety valve Z.

To prevent this effect, one provides a safety valve Z adjusted to work only at low speed. For normal and high speeds, a piston or any obturating member, controlled by a kind of regulator in function of the speed of rotation, or by a system in function of the pressure in the intake tube, or of the pressure of the lubricating oil, closes the discharge openings $Z_2$, and thereby allows for having in the system $D_2$ the high pressures required for the high rates.

Figure 5:
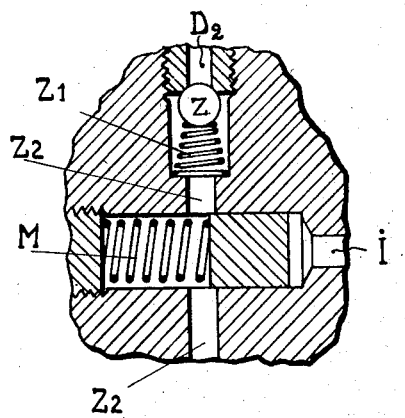
Figs. 5, 6 and 7 show apart, in section, modifications of the safety-valve inserted in the hydraulic system.

Such a system is schematized on Fig. 5, in which the replenishing fluid arriving at I (for instance the lubricating oil) above a given pressure, determined by a calibrated spring M, pushes a plunger or slide-valve L across the discharge canal $Z_2$, and thereby closes said canal.

Figure 6:
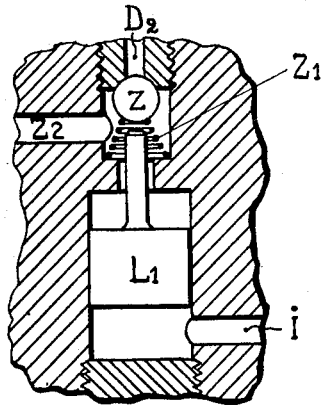
Figure 7:
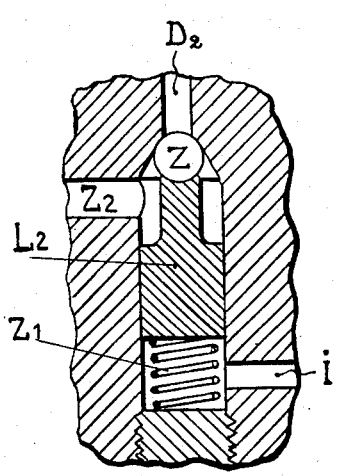

Figures 6 and 7 show a modification of the system of Fig. 5, in which the pressure in I acts upon pistons $L_1$, $L_2$, not to close the discharge canal $Z_2$, but to add its action to that of the spring $Z_1$ of the safety valve $Z_2$ in normal and high conditions of run of the engine. At low speed only the spring $Z_1$ opposes the opening of the valve Z.

Obviously the spring $Z_1$ may be mounted either between the valve Z and the piston $L_1$ (Fig. 6) or under the piston $L_2$ (Fig. 7).

Figure 8:
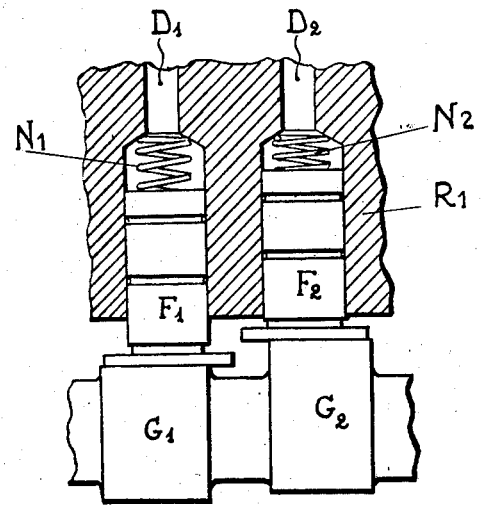
Fig. 8 shows more or less schematically a modification of the cam arrangement constituting the driving member.

In certain applications, grooved cams such as G are not practical. In this case it is advantageous to use, as driving member, a pair of plain cams $G_1$, $G_2$ (Fig. 8) which actuate pistons $F_1$, $F_2$ working in a cylinder-block $R_1$. Relatively weak springs $N_1$, $N_2$ maintain the pistons $F_1$, $F_2$ constantly applied on the periphery of the cams $G_1$, $G_2$. The cam $G_1$ controls the opening of the valve A, while the cam $G_2$ controls its closure.

It is to be understood that the invention is not restricted to the precise arrangement of parts as shown and described, as details of construction may be modified and rearranged without departing from the scope of the invention as defined in the appended claims.

I claim:

1. In a hydraulic valve operating system the combination with a valve seat and a valve movable relative thereto, a hydraulically actuated cylinder-piston motor operatively connected to said valve, an actuating cylinder-piston motor, two liquid conduits connecting the opposite areas of the actuating piston with the opposite areas of the actuated piston whereby movement of the actuating piston in one direction will positively open and movement in the other direction positively close said valve, means for constantly compensating leakages during operation, spring means adapted to close said valve when the volume of liquid in one of said conduits decreases below a predetermined value, and relief means adapted to prevent excess liquid pressure in the other conduit when said valve has been closed by said spring means.

2. A hydraulic valve operating system comprising in combination with a rotating shaft, a cam member mounted to rotate with said shaft, a first cylinder, an actuating piston movable in said first cylinder, means designed to transform angular movement of said cam member into reciprocating movement of said actuating piston, a valve seat and a valve movable relative thereto, a second cylinder, an actuated piston in said second cylinder operatively connected to said valve, a spring member urging said valve toward said valve seat, liquid filled conduits connecting the opposite areas of said actuating piston with the opposite areas of said actuated piston whereby movement of said actuating piston in one direction will positively open and movement in the other direction positively close said valve, means for compensating leakages during operation, and a relief valve to prevent excess valve closing liquid pressure on said valve when the same has been closed by said spring member.

3. A hydraulic valve operating system according to claim 2, wherein two separate actuating cylinder-piston motors are connected by said liquid filled conduits to said opposite areas of the actuated piston, respectively, said rotating shaft being provided with means adapted to periodically move one of the actuating pistons to positively open and to periodically move the other actuating piston to positively close said valve.

SERGE DE WRANGELL.

REFERENCES CITED

The following references are of record in the file of this patent:

UNITED STATES PATENTS

| Number | Name | Date |
|---|---|---|
| 1,696,984 | Trbojevich | Jan. 1, 1929 |
| 1,769,686 | Goldsborough | July 1, 1930 |
| 2,329,662 | Steiner | Sept. 14, 1943 |

FOREIGN PATENTS

| Number | Country | Date |
|---|---|---|
| 573,596 | France | June 26, 1924 |
| 748,426 | France | Apr. 18, 1933 |